United States Patent [19]

Mercier et al.

[11] 4,088,522

[45] May 9, 1978

[54] METHOD AND APPARATUS FOR SEALING THE FOUR EDGES OF A MULTIPLE PANE WINDOW

[75] Inventors: Alain Mercier, Courbevoie; Yves Fournier, Chalon-sur-Saone, both of France

[73] Assignee: Saint-Gobain Industries, Neuilly-sur-Seine, France

[21] Appl. No.: 622,539

[22] Filed: Oct. 15, 1975

[30] Foreign Application Priority Data

Oct. 15, 1974   France ................... 74 34640

[51] Int. Cl.$^2$ .............. B32B 31/00; B05B 7/00
[52] U.S. Cl. ................ 156/107; 156/109;
156/292; 156/357; 156/360; 156/575; 156/578;
271/240; 271/184; 271/196
[58] Field of Search ............. 156/107, 109, 292, 356,
156/357, 360, 500, 244, 566, 574, 575, 578, 556,
558, 559, 560, 562, 285, 364; 408/34; 118/316,
315, 408, 411, 412; 114/86; 214/1 S, 1 BS;
50/616; 188/34, 416; 271/240, 184, 196, 197;
65/58, 64

[56] References Cited

U.S. PATENT DOCUMENTS

| | | | |
|---|---|---|---|
| 2,294,472 | 9/1942 | MacKenzie | 12/89 |
| 2,999,036 | 9/1961 | Clever et al. | 427/284 |
| 3,424,836 | 1/1969 | McKelvey et al. | 118/316 |
| 3,473,988 | 10/1969 | Rullier et al. | 156/107 |
| 3,543,385 | 12/1970 | Javaux et al. | 65/58 |
| 3,682,469 | 8/1972 | Itoh et al. | 271/296 |
| 3,759,771 | 9/1973 | Battersby | 156/109 |
| 3,876,489 | 4/1975 | Chenel | 156/109 |
| 3,886,013 | 5/1975 | Bowser et al. | 156/109 |
| 3,928,114 | 12/1975 | Aylon | 156/362 |
| 3,947,311 | 3/1976 | Jarchow et al. | 156/107 |

FOREIGN PATENT DOCUMENTS 2,402,642   7/1975   Germany ............... 65/58

*Primary Examiner*—William A. Powell
*Assistant Examiner*—Michael W. Ball

[57] ABSTRACT

Apparatus for applying plastic material to the four edges of a multiple-pane window comprises first and second pairs of nozzles and first and second carriers for moving the window horizontally between the nozzles of each pair in succession. Transfer means, particularly a rotating column with a laterally extending arm, transfers the window from one carrier to the other and rotates the window to bring the edges uncoated at the first station in position for coating at the second station. The transfer device is advantageously correlated with the downstream limit of the first carrier and the upstream limit of the second carrier to transfer and rotate the window about its axis of symmetry. A function of the window length on the first carrier is measured and the separation of the nozzles of the second pair adjusted accordingly. A supply device centers a window and deposits it in a predetermined centered position in the first carrier. A downstream manipulator raises the windows to vertical positions, and a leading edge detector stops the second carrier when the leading edge of each window is a predetermined distance from the axis of rotation of the manipulator.

22 Claims, 3 Drawing Figures

METHOD AND APPARATUS FOR SEALING THE FOUR EDGES OF A MULTIPLE PANE WINDOW

The present invention pertains to application of plastic material along the four edges of multiple-pane windows, for example, polymerizable material.

Heat-insulating multiple-pane windows comprise a plurality of sheets of glass spaced from each other by peripheral seals generally made of plastic material. These seals have a two-fold function. Firstly, they effect an air-tight sealing off of the internal air space between the sheets of glass to prevent ingress of water vapor and dust from the atmosphere. Secondly, they hold the sheets in proper position and spacing from each other. In practice these seals are composed of an inner filament of a first plastic material such as polyisobutylene, and of an outer coating of a second plastic material such as an elastomer of silicone or of polysulfide.

The inner filament is frequently produced by the simultaneous extrusion of two filaments, one containing dessicant materials and the other without. The outer mastic is injected between this inner filament and the actual edges of the glass sheets. By virtue of its good adhesive properties, it maintains a correct mechanical or geometrical positioning of the assembly, while reinforcing the hermetic seal.

The manufacture of such thermally insulating windows is effected on assembly lines which include transport and handling devices together with an extruding machine for deposition of the inner filament and a machine for application of the outer coating.

In our application Ser. No. 621,026, filed Oct. 9, 1975, and entitled *"METHOD AND APPARATUS FOR SIMULTANEOUSLY SEALING TWO EDGES OF A MULTIPLE PANE WINDOW"*, there is described a method and apparatus for applying sealing material including a centering system having two bars which can be moved toward and away from each other in parallel relationship and symmetrically with respect to the longitudinal axis of the machine in order to engage the opposite edges of the window glass. Coatings are applied during passage of the window lengthwise of these bars, a feed nozzle being disposed at the end of each of the bars and movable therewith. This makes it possible to apply the sealant simultaneously to two opposed edges of the window and substantially raises the speed of fabrication of windows of this type.

Nevertheless, in order to apply sealant to all four edges of a multiple-pane window, it is necessary to grasp the window after coating two edges and bring it back to a suitable position at the upstream end of the machine through which it must pass a second time for the application of the coating material to the other two edges.

The present invention has for an object to avoid this inconvenience and provides apparatus for coating the edges of a multiple-pane window making possible optimum use of the equipment. In the apparatus of the invention the windows or panes are never returned upstream but instead advance continuously at a short spacing one from another from the input to the output ends. Consequently, the nozzles for application of the sealing material operate substantially continuously, their operation being interrupted only for the short intervals necessary to pass from one window to the next.

To this end the apparatus of the invention comprises:

(a) a first carrier apparatus suitable to cause the window to move horizontally between oppositely disposed injection nozzles at a first coating station so as to coat the first two opposite parallel edges of the window;

(b) a second carrier apparatus adapted to cause the window or window assembly arriving from the first coating station to pass between oppositely disposed injection nozzles at a second coating station for coating of the other two edges; and (c) transfer means for transferring the window from the first to the second carrier apparatus and rotating the window to orient the edges uncoated at the first station in position for coating them at the second station.

The first and second coating stations and the first and second carriers, with their associated apparatus, may be of the type described in the above-identified copending application. The means for transferring the window from the first carrier to the second carrier may include, in an exemplary preferred embodiment, a pillar or column disposed to rotate about a vertical axis under the control of actuating means, the column including an arm which can be brought into contact with the window, for example by means of suction cups, to grasp it.

Advantageously, detecting means are provided to measure the length of the window as it passes through the first coating station. This length becomes the width of the window at the second station, and this detecting means serves to bring the coating nozzles at the second station to a suitable separation for coating the previously uncoated edges.

According to another feature of the invention the apparatus thereof comprises, upstream of the first carrier, a supply mechanism which receives the windows oriented vertically and which, after suitably centering them, rotates them through 90° so as to deliver them to the first carrier with their faces horizontally disposed.

According to a further feature of the invention, an output manipulator is provided downstream from the second carrier to receive the horizontally disposed windows and deliver them with vertical orientation to a subsequent processing station, detector means being provided to stop the leading edges of the windows at a proper distance from the output manipulator to enable them to be turned vertically regardless of their length.

The invention will now be further described in connection with a presently preferred embodiment thereof, taken in conjunction with the accompanying drawings, in which.

DETAILED DESCRIPTION OF THE SPECIFIC EMBODIMENT

Figure 1:
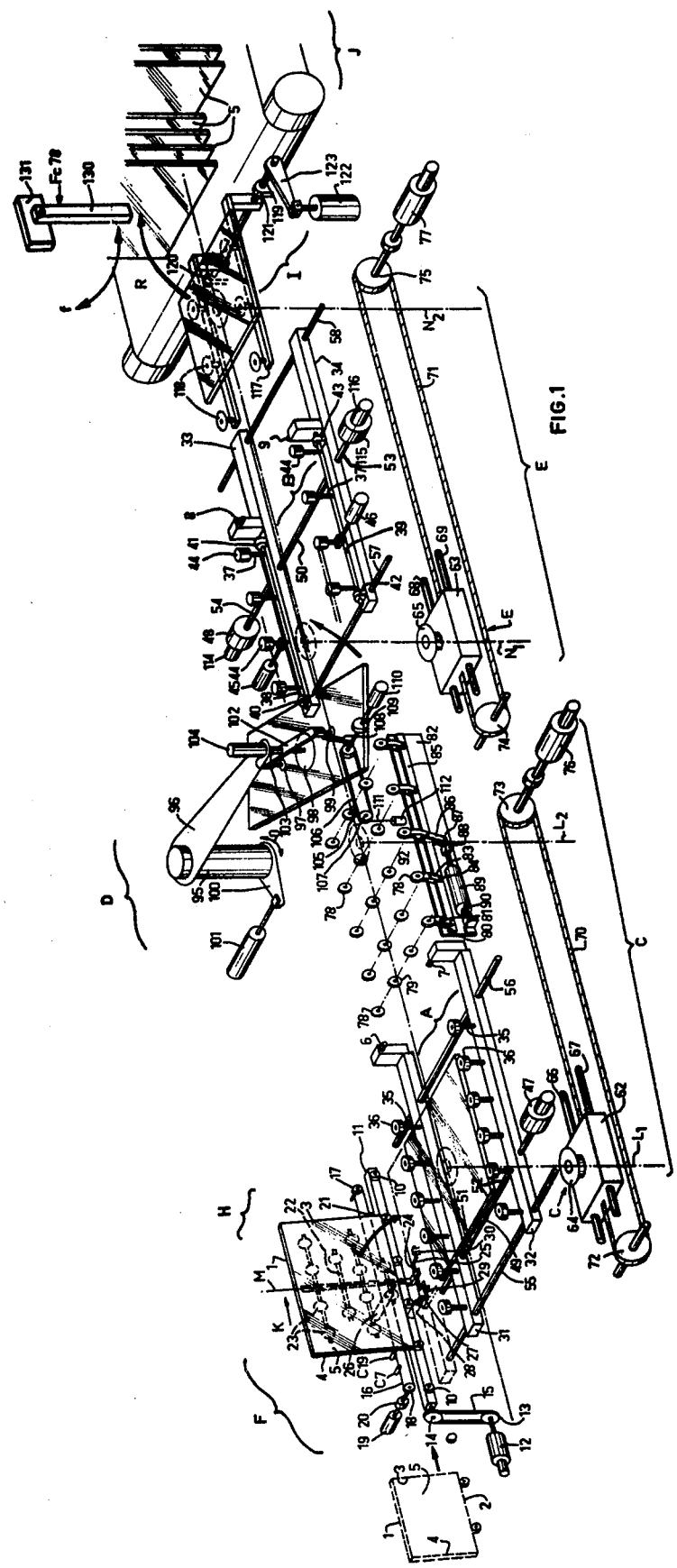
FIG. 1 is a schematic perspective and exploded view of apparatus in accordance with the invention.

The apparatus shown in FIG. 1 includes a number of assemblies for the performance of different operations, these assemblies being generally identified by brackets denoted A–F and H–J. Thus the apparatus includes two coating stations or assemblies A and B, the first being adapted to coat a first pair of opposite parallel edges 1 and 2 of a multiple-pane window 5, and the second functioning to coat the other pair of opposite parallel edges 3 and 4.

The apparatus includes a carrier C associated with the first station A and having the function of carrying the window 5 between and past injection nozzles 6 and 7 at station A. A second carrier E associated with station B carries the window 5 past and between the nozzles 8 and 9 at station B.

The apparatus further includes means D for transferring the window from carrier C to carrier E. It also includes, adjacent station A, a supply device F on which the windows or panes are vertically stacked, and a handling device H whose function is to seize the windows and deposit them horizontally on the carrier C. Downstream of station B, the apparatus includes a manipulator I whose function is to transfer the window 5 from the carrier E to the following work station indicated at J.

Each of these assemblies will now be described in further detail.

The feed or supply device F adjacent the first station A comprises a series of rollers 10 supported on horizontal axes by means of a frame 11 and driven by a two-speed motor 12 through sprocket wheels 13 and 14 and a chain 15. The windows or panes 5 advance and rest at their edges 2 on the rollers 10 in a vertical or nearly vertical position, being guided by spherical rollers (not shown) commonly employed in the glass industry.

A centering device disposed above the frame 11 includes an endless belt 16 moving on pulleys 17 and 18, one of these being driven by a motor 19 having a zero reset by way of a clutch 20. On the lower half or lower run of the belt 16 there is mounted a finger 21 and on the upper half or run thereof two optical detectors C7 and C19 are attached.

The apparatus F operates as follows: In the course of advance of a window 5 in the direction indicated by the arrow K, its leading edge 3 will engage the finger 21. This moves the lower run of belt 16 to the right, and consequently detectors C7 and C19 by equal amounts to the left. When the trailing edge 4 passes the optical axis of detector C7, a control signal is supplied to motor 12, which is the drive motor for the carrier F, shifting it to low speed. The window 5 continues to advance slowly until its rear edge 4 passes the axis of detector C19, at which time a stop signal passes to the motor 12.

The finger 21 and the detector C19 are initially aligned with the axis $L_1$ of the window carrier, which takes the form of a carriage 62 to be described hereinafter and which forms part of the carrier C, when this carriage is in its initial or rest position. It will be understood that by action of the window 5 on the finger 21, the latter together with the detector C19 will be displaced (with slippage at the clutch 20) by equal and opposite amounts on opposite sides of the axis $L_1$ so that when the detector C19 is opposite the edge 4 of the window the axis M of the window itself is aligned with the axis $L_1$ of the support carriage 62.

It may be noted that, for clarity, the drawing does not indicate the fact that the finger 21 includes a microswitch which is open until the leading edge 3 of the pane 5 strikes the finger, this being for the purpose of discarding the signals from the detectors C7 and C19 when the leading edge of the window passes thereby.

The manipulator H comprises a frame 22 having a plurality of suction cups 23. The frame pivots about the central portion 24 of a crank 25 by the action of an hydraulic cylinder 26. The crank 25 is fixed to a connecting rod 27 which is coupled to an actuating piston 28. Upon operation of the latter, the crank 25 rotates in fixed bearings 29 and 30 so as to bring its central portion 24 close to the plane of window 5. This brings the suction cups 23 against the window. When this has been effected and vacuum is applied to the suction cups, the actuating piston 26 rotates the frame 22 about the central portion 24 of the crank 25 so as to bring the window 5 into a horizontal position over the carrier C.

The two stations A and B comprise respective pairs 31, 32, and 33, 34 of guide bars. The guide bars of each pair are adapted to shift parallel to each other and symmetrically with respect to the longitudinal axis of the machine so as to be applied against opposite edges 1 and 2 of window 5 at station A, and opposite edges 3 and 4 at station B. The window is rotated 90° in passing from A to B, as will be explained.

The coating or injection is effected simultaneously along two opposite edges of the window at each station, by motion of the window past and between the nozzles 6, 7 affixed to bars 31, 32 at station A, and nozzles 8, 9 affixed to bars 33, 34 at station B. The bars 31, 32 at station A mount a plurality of shafts 35 which are stationary thereon and support centering rollers 36 which contact and guide opposite edges 1 and 2 of the window.

The bars 33, 34 at station B each carry a set of shafts 37 affixed to rods 38, 39 parallel to the longitudinal axis of the machine and mounted to turn in bearings 40, 41 and 42, 43. Each shaft 37 carries a centering roller 44. One of shafts 37 of each set is coupled to an actuating cylinder 45, 46 in such a manner as to bring the two assemblies of centering rollers symmetrically (with respect to the longidudinal axis of the machine) into contact with the opposite edges 3 and 4 of the window when it is at station B.

Stations A and B each include a frame, not shown. These frames carry motors 47, 48 which are reversible and which have two speeds for driving lead screws 49, 50 each having separate halves 51, 52 or 53, 54 of opposite pitch. Bars 31, 32 include oppositely ordered threads which cooperate with the oppositely ordered male threads on lead screw 49, and similarly for bars 33, 34 and lead screw 50. The ends of the bars move on rails 55, 56 and 57, 58, with the aid of ball bearings (not shown).

Between the bars 31, 32 at station A, and about the axis $L_1$ of the carriage or transporter 62, there are provided a plurality of support bearings (not shown) which carry the window 5 when the manipulator H moves it from its vertical position on the carrier F to a horizontal position between the bars 31 and 32. No such support bearings are provided at station B since the edges 1 and 2 of the window have already been coated at station A and these edges extend transversely at B. Thus such bearings would be rapidly soiled by the passage of freshly coated window edges and consequently would soil subsequent windows.

Station B is therefore provided with support means of the type disclosed in our copending application Ser. No. 621,025, filed Oct. 9, 1975 and entitled "APPARATUS FOR SUPPORTING THE EDGES OF A WINDOW", now Pat. No. 3,990,570, issued Nov. 9, 1976. This provides adequate support for the window while avoiding soiling.

Figure 3:
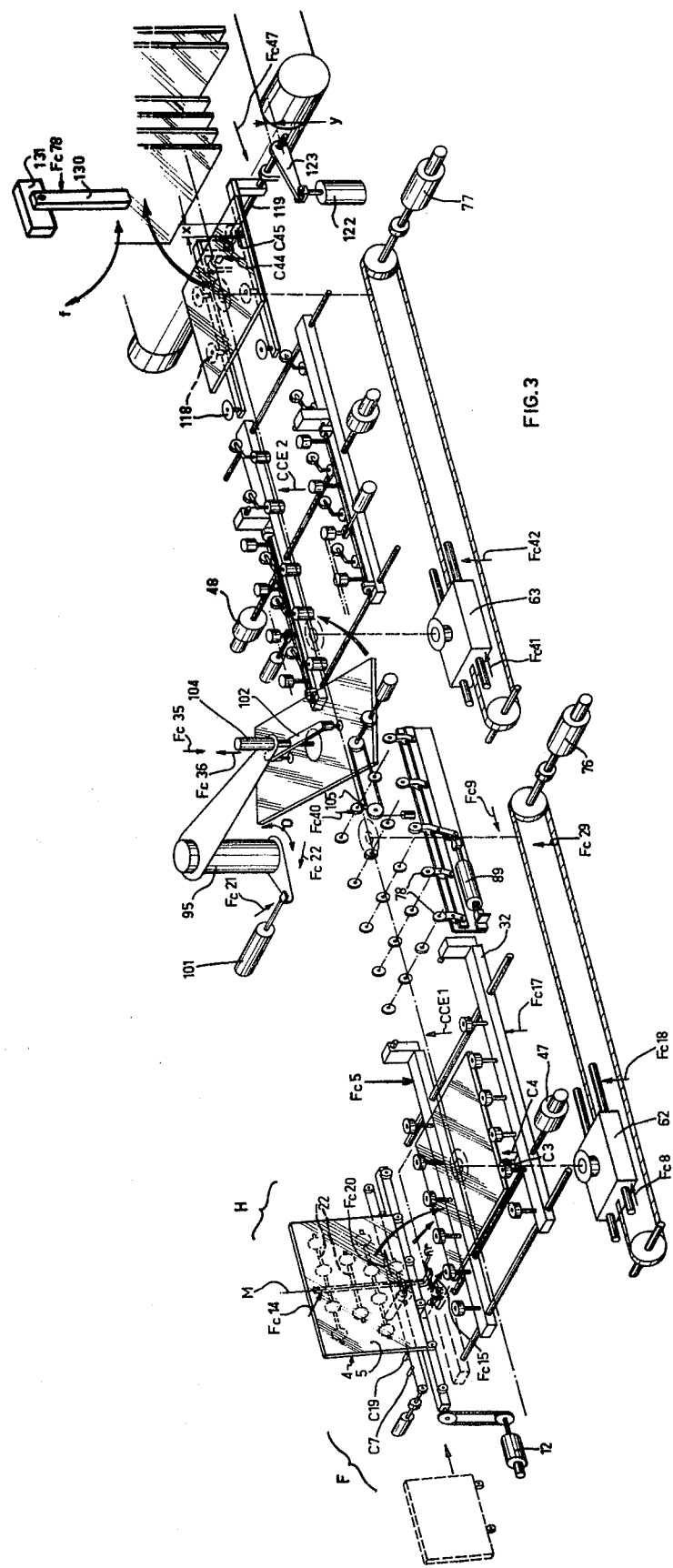
FIG. 3 is a perspective view similar to FIG. 1 but showing the location of the various electrical switches and detectors.

The carriers C and E are associated respectively with the coating stations A and B and are mounted between the bars 31 and 32 in the first case and 33 and 34 in the second case, to extend parallel to those bars. For clarity, they are shown in FIGS. 1 and 3 beneath the bars in exploded view.

Carriers C and E each comprise a carriage 62, 63 having a central suction cup 64, 65. Suction cup 64 is movable between lower and upper positions, whereas suction cup 65 is stationary with respect to vertical motion. Carriages 62 and 63 move on bearings along rails 66, 67 and 68, 69 parallel to the bars at stations A and B, and are fixed to the frame of the apparatus. The carriages are driven by chains 70, 71 on sprockets 72, 73 and 74, 75. The sprockets 73 and 74 are driven by reversible motors 76 and 77, respectively.

Downstream of station A are support means for the window as it moves past nozzles 6, 7. The support means comprises a plurality of outer rollers 78 and inner rollers 79 rotating on horizontal axes. The lateral separation of rollers 79 is less than the width of the smallest window to be handled. With this construction, the rollers 79 can be in fixed position. In contrast, the rollers 78 are carried by lever arms 80 pivoted about axes 81 fixed in the frame 82. For clarity of the drawing, the lever arms 80, shafts 81 and frame 82 and related structure have been shown on only one side of the machine which is symmetrical in this respect.

The lower end of one of the lever arms 80 extends downwardly at 86 and is coupled by a shaft 87 to the extremity 88 of the driving rod of an hydraulic cylinder 89. The cylinder is fastened at its other end by a pin 90 to the frame 82. When the cylinder 89 is operated, its piston acts through lever extension 86 and the connecting rod 85 to produce an upward or downward motion of the set of rollers 78. The rollers 78 are normally in lowered position, and are raised to support the edges of a window 5 when the width of the window exceeds by a given amount, say 4 centimeters, the distance separating the two rows of rollers 78, as hereinafter will be explained.

Carriage 62 moves from an upstream starting position in which the axis $L_1$ of the suction cup 64 is opposite the axis M of the window pane to a downstream position indicated by the line $L_2$. The carriage has a reverse motion of the same extent. These positions are defined by the limit switches denoted Fc8 and Fc9 in FIG. 3.

Carriage 63 moves such that the axis of its suction cup passes from its upstream position $N_1$ to the downstream position $N_2$ and vice versa. These positions are likewise defined by the microswitch contacts or limits denoted Fc41 and C45 (FIG. 3), the function of which will be described later.

As already stated, carriers A and B are disposed between the bars 31, 32 and 33, 34 and above the mechanism for supporting and driving these bars, that is, above rails 55, 56 and 57, 58 and the lead screws 49 and 50. Moreover, the suction cup 64 of the carriage 62 at station A moves upwardly and downwardly, so that when it is in its upper position it grasps the window 5 resting on support bearings (not shown). As heretofore mentioned, the suction cup 65 of carrier 63 at station B is fixed in vertical position.

Transporting means D are disposed between stations A and B to lift window 5 from the first carrier C and deposit it on the second carrier E. In the case of the embodiment illustrated, these means rotate the window through 90° in its own plane. The rotator comprises a vertical column 95 having a horizontal arm 96 affixed thereto, the latter carrying a vertically movable arm 102 equipped with suction cups 97, 98 and 99. The foot of the column 95 is fixed with lever arm 100 operated by hydraulic cylinder 101. Arm 102 is attached to the vertical actuating rod 103 of hydraulic cylinder 104. Thus the suction cups can be shifted between high and low positions.

Column 95 is mounted on a bearing (not shown) and has a motion stop which enables the column to rotate about its axis by action of cylinder 101 as indicated by arrow 0 between limit position contacts Fc21 and Fc22 (FIG. 3), i.e. between a position in which the vertical axis of central suction cup 98 is aligned with the axis of carriage 62 at its downstream position $L_2$ and a position in which the axis of this cup is aligned with the axis of carriage 63 when the latter is in its upstream position $N_1$.

The sequence of operation will be described hereinbelow in conjunction with a description of the operation of the different switches.

Upstream of the second station B is a device which measures a half-length of the window pane 5. This device comprises a finger 105 carried on a chain 106 moving on sprocket wheels 107, 108. Wheel 108 is coupled through an electrically actuated brake 109 to a potentiometer 110. The sprocket wheel 107 is fixedly coupled to a drum not seen in FIG. 1 on which is wound a thread or wire 111 having a counterweight 112 at the end thereof.

The means to measure the half-length of the window operates as follows:

As the carriage 62 carrying the window 5 on its suction cup 64 moves to its end position $L_2$, the leading edge 3 of the window will be brought up against the finger 105 and will move it downstream by a distance which depends upon the longitudinal dimension of the pane, more particularly its half-length since the geometrical center of the window coincides with the axis of the suction cup 64 and the downstream position $L_2$ is always in the same position as determined by a microswitch Fc9. In moving downstream the finger 105 drives the chain 106 and hence the sprocket wheels 107 and 108. This drives potentiometer 110 and also raises the counterweight 112 until carriage 62 reaches the end of its travel.

When the window 5 is thereafter lifted from the carriage 62 by the device D, and when the latter reaches the downstream position, it actuates a microswitch indicating end of travel and identified as Fc22 which releases the brake 109. The counterweight descends and finger 105 is restored to its starting position, ready for a new measurement.

Figure 2:
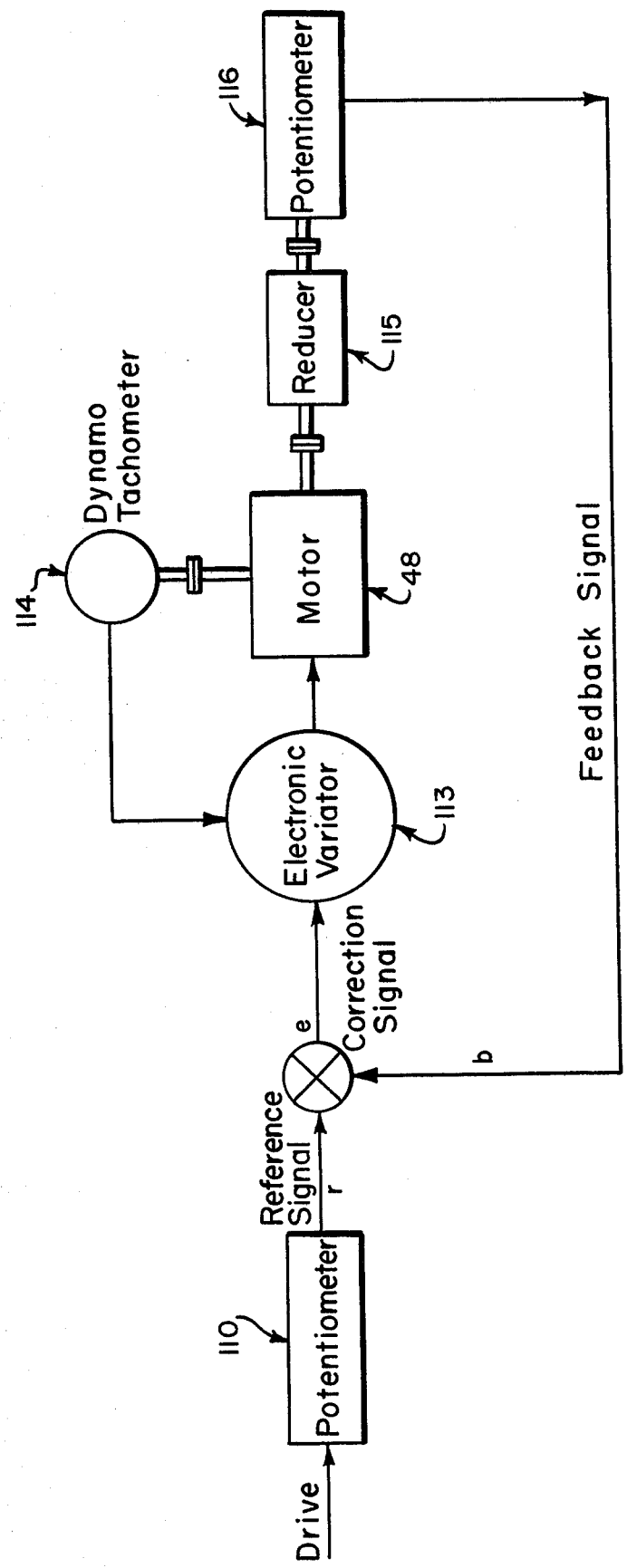
FIG. 2 is a block diagram of the electrical circuit for control of the motor which controls the centering mechanism at the second injection station.

The means for measuring the half-length is coupled to the two-speed motor 48 which drives the centering bars 33 and 34 at station B by means of a rotary positioning serve-mechanism which is shown in detail in FIG. 2.

In FIG. 2, it will be seen that the potentiometer 110 is connected to a comparator whose output is fed to an electronic variator 113, including thyristors. Motor 48 is mechanically coupled to a tachometer generator 114 and also through reducer 115 to a feedback potentiometer 116 which may be similar to potentiometer 110. Potentiometer 110 produces a reference signal and the potentiometer 116 produces a feedback signal which is compared to the reference signal. The tachometer generator 114 develops a signal representative of the speed of the motor 48. Overall, motor 48 rotates by an amount determined by potentiometer 110.

This constitutes a known arrangement of a rotary servomechanism and need not be further described.

Control of the motor 48 by the mechanism for measuring the half-length of the window results in positioning the bars 33 and 34 of the second coating station B at a separation corresponding to the separation of the edges 3 and 4 of the window. Thus the guides at station B are automatically positioned to receive and guide the window as turned 90° by transfer mechanism D.

Downstream of station B is provided a handling device I which includes a lifting frame 117 having a plurality of suction cups 118. This frame is fixed to a shaft 119 turning in bearings 120 and 121. Under control of an hydraulic actuating cylinder 122 and via lever 123, the frame 117 can be shifted between horizontal and vertical positions as indicated by the arrow R so as to bring the windows into vertical orientation at the downstream operating station J.

The operating station J is shown schematically in FIG. 1 as a carrier on which the vertically oriented windows 5 move into an oven (not shown) for polymerization of the sealing material.

FIG. 3 is similar to FIG. 1 and additionally shows schematically switches and detectors involved in the operation of the apparatus. Certain of the switches have been mentioned hereinabove but will be recapitulated in a complete list of those appearing in FIG. 3.

C7 identifies a detector which acts in response to passage of the rear edge 4 of window 5 and initiates slowing of the motor 12.

C19 identifies a detector which responds to passage of the trailing edge 4 of the window 5 to stop motor 12, the window then being centered in respect to the axis M.

Fc15 identifies an end of travel switch operated by the frame 22 when the latter comes into horizontal position.

Fc14 identifies another end of travel switch operated by the frame 22 when it is in in vertical position.

C3 identifies a detector carried by the centering bar 32 upon passage of the end 1 of window 5 initiates slow speed rotation of motor 47.

C4 identifies a detector on the centering bar 32 which upon passage of the edge 1 stops motor 47.

Fc17 identifies a switch which upon passage of the bar 32 acts on the hydraulic cylinder 89 so as to actuate the mechanism associated with rollers 78.

Fc20 identifies an end of travel switch for the centering device of the carrier F at its initial position.

CCE1 identifies a detector which upon passage of the leading and trailing edges 3 and 4 of the window 5 initiates slow speed motion of the motor 77 and the first coating step.

Fc5 identifies an end of travel swtich operated by the bar 31 when it reaches its position of maximum separation from bar 32 and stops motor 47.

Fc18 identifies an end of travel switch which establishes low speed for motor 76 driving carriage 62 in its return to upstream position.

Fc29 identifies an end of travel switch for the carriage 62 which establishes low speed for motor 76 in its downstream motion.

Fc8 identifies an end of travel switch for the return upstream motion of the carriage 62 and which upon operation stops the motor 76.

Fc9 identifies the downstream end of travel switch for carriage 62, stopping the motor 76, causing the arm 102 to descend, and energizing motor 48.

Fc36 identifies an end of travel switch for low position of the arm 102 of column 95 and which serves to stop the hydraulic cylinder 104.

Fc35 identifies an end of travel switch for upper position of the arm 102 of column 95 which stops cylinder 104.

Fc22 identifies an end of travel switch for the downstream rotation of column 95 and which stops cylinder 101.

Fc21 identifies an end of travel switch for the return of column 95 to its upstream rotational position and which stops the cylinder 101.

CCE2 identifies a detector which upon passage of the edge 1 of the window 5 sets the motor 77 to its low speed operation and initiates the second coating operation.

Fc41 identifies an end of travel switch actuated by the return of the carriage 63 to its upstream position and which accordingly stops the motor 77.

Fc42 identifies an end of travel switch which shifts the motor 77 to low speed of carriage 63 near the end of its return to upstream position.

C44 identifies a detector which upon passage of the leading edge 1 of window 5 initiates the low speed operation of motor 77.

C45 identifies an end of travel switch for the carriage 63 on its downstream travel, operated by the leading edge 1 of the window to stop motor 77.

Fc47 identifies an end of travel switch for the manipulator I when it reaches vertical position.

Fc78 identifies an end of travel switch actuated upon arrival of the oscillating arm 130 to its vertical position to hold the window which has just been placed vertically on the transporter. When the switch Fc78 is excited it returns device I to horizontal position.

Vacuum-stats, although not shown in the drawings, are provided to indicate the following:

VVBB: Existence of vacuum in the suction cups 23 for the manipulator H.

VVE1: Existence of vacuum in the suction cup 64 of carriage 62.

VVET: Existence of vacuum in the suction cups 97, 98 and 99 of the column 95.

VVE2: Existence of vacuum in the suction cup 65 of carriage 63.

VVE3: Existence of vacuum in the suction cups 118 of manipulator I.

The electric connections have numerous secondary contacts which are within the skill of the art, have not been shown, and will not be included in the following description of the operation.

Describing the sequence of operation, when the rear edge of the window, vertically oriented on the carrier F, reaches the detector C19, a stop signal is sent to the motor 12, the rollers 10 of the carrier F stop, and the window 5 is then in its centered position. At the same time, vacuum is applied to the cups 23 of the manipulator H and cylinder 28 receives a command signal which, via the connecting rod 27 and the crank 25, initiates motion of the frame 22 toward the window. The suction cups thus come into contact with the window and grasp it.

At this time a vacuum-stat VVBB detects presence of vacuum in suction cups 23 and develops a control signal which initiates action of the hydraulic cylinder 26, thereby actuating the manipulator H. When the frame 22 reaches the horizontal position it operates the end of travel switch Fc15 which delivers a control signal to cut off vacuum to the cups 23 and to reverse the motion of the cylinder 26 to raise the frame 22. The signal also actuates the motor 19 in order to restore the centering system to its inactive or waiting condition, and initiates operation of the motor 47 so as to move the centering bars 31 and 32 toward each other.

While bars 31 and 32 are approaching each other, the frame 22 returns to its vertical position where it operates the end of travel switch Fc14. This delivers a stop signal to the cylinder 26. During the closing movement of bars 31 and 32 the window rests on supports (not shown) on opposite sides of the carriage 62.

When the detector C3 on the bar 32 detects passage of the edge 1 through its optical axis, the detector delivers a signal which shifts the motor 47 to low speed. When the detector C4, likewise carried by the bar 32, detects passage of the edge 31 through its optical axis, that detector delivers a signal which stops the motor 47 and hence the motion of the bars, initiates upward motion of the suction cup 64 on the carriage 62, produces a vacuum in that suction cup, and initiates upward movement of the rollers 78 by the cylinder 89. In the case of narrow windows the bar 32 approaches the bar 31 sufficiently to pass in front of the detector Fc17 and to excite it, whereupon the rollers 78 are lowered.

When the suction cup 64 arrives at its upper position the window 5 will be against the cup and the vacuumstat VVE1 of the cup delivers a control signal which energizes motor 76 to drive carriage 62. The carriage therefore comes out of engagement with its upstream end of travel switch Fc8.

Meanwhile the longitudinal centering system in F will be restored to its starting position and the finger 21 will have operated the end of travel switch Fc20 which delivers a stop signal to the motor 19. The next following window delivered to the transporter F will in similar fashion bring up at its leading edge against finger 21 and the cycle will be repeated in the manner described.

In the course of advance of the carriage 62 from its upstream position $L_1$ toward its downstream position $L_2$, the leading edge 3 of the window will intercept the optical axis of detector CCE1 which is disposed a short distance upstream of the coating or injection nozzles 6, 7. The detector CCE1 then delivers a signal which causes the motor 76 to shift to low speed for a predetermined time by a timing mechanism (not shown) and initiates, with a suitable time delay, delivery of the sealing material to the nozzles. After the interval of low speed travel the motor 76 returns to high speed. The low speed interval allows easy engagement of the edges 1 and 2 against the coating nozzles 6 and 7.

When the trailing edge 4 of the window intersects the optical axis of detector CCE1, the latter develops a signal which shifts the motor 76 to low speed for a time determined by a known timer, and which shuts off the delivery of coating material, again after a suitably established delay. The trailing edge signal also reenergizes motor 47 after a suitable time delay, so as to spread the bars 31 and 32 and bring them to their position of maximum separation, which position is reached when the contact Fc5 responsive to motion of the bar 31 delivers a stop signal to motor 47.

After the termination of the phase of low speed travel the motor 76 returns to high speed, the low speed phase having facilitated separation of the window from the nozzles. Meanwhile the leading edge 3 will have come into contact with the finger 105 on sprocket chain 106 and will have shifted it so as to rotate the potentiometer 110 against the force of counterweight 112.

When the carriage 62 arrives near its downstream limit position it actuates switch Fc29 to produce a control signal which shifts motor 76 to low speed. Shortly thereafter the carriage operates the end of travel switch Fc9 which stops the motor 76. The carriage is accordingly stopped in its downstream position $L_2$. The rotation of potentiometer 110 likewise ceases and it stores a value which is a function of the distance separating the edges 3 and 4 of the window plus or minus a certain tolerance.

It will be seen that the carriage 62 undergoes a fixed length of travel between the upstream and downstream end of travel switches Fc8 and Fc9. This distance is determined by the separation of the switches and is not dependent on the dimensions of the window.

When the bars 31 and 32 have effected centering, that is, at the instant when the window is held between the rollers 36 and the detector C4 has delivered a signal corresponding to edge 1, the geometric center of the window will be at the center of the suction cup 64. During the entire travel of the carriage 62 the window will remain in this position by the vacuum in suction cup 64.

When the carriage 62 arrives at its downstream limit $L_2$, the closure of switch Fc9 initiates descent of the arm 102 of transfer column 95 and energizes motor 48. Under control of the servo mechanism shown in FIG. 2, the motor 48 will bring the centering bars 33 and 34 to the separation corresponding to the spacing between edges 3 and 4 of window 5. When the arm 102 arrives at its lower position, it will operate the end of travel switch Fc36 which stops the hydraulic cylinder 104 and establishes a vacuum in the cups 97, 98, 99.

When the vacuum-stat VVET detects existence of this vacuum, it delivers a signal which cuts off vacuum to the cup 64 of carriage 62, initiates return of cup 64 to its lower position, returns rollers 78 to their lower position, starts the return upstream of carriage 62, and raises arm 102 to its upper position. Accordingly window 5 is raised.

When the arm 102 arrives at its upper position, it operates the end of travel switch Fc35 which delivers a signal to stop the cylinder 104, and simultaneously initiates action of the hydraulic cylinder 101. This rotates column 95 and its arms 96 and 102 downstream, and consequently transports window 5 downstream suspended by the vacuum cups 97, 98 and 99. This rotation of column 95 begins at low speed, shifts to high speed, and ends at low speed. These changes in speed are controlled by the arm 100 which engages successive contacts (not shown).

During this rotation the carriage 62 continues its return upstream. It is slowed by passing switch Fc18 and then stopped when arriving at the end of travel switch Fc8. The carriage then is in its upstream position $L_1$ ready to receive a new window.

When the arm 100 of column 95 operates the end of travel switch Fc22, this switch delivers a signal which stops the hydraulic cylinder 101, initiates downward travel of the arm 102 and disengages the brake 109 of potentiometer 110. When the arm 102 reaches its lower position, it operates the end of travel switch Fc36. This delivers a signal which reverses the motion of the control cylinder 104 for the arm 102, cuts off vacuum to the cups 97, 98 and 99, initiates action of the control cylinders 45 and 46 for the centering rollers 44, and lastly, after a short delay permitting the centering rollers time to operate, establishes vacuum in the cup 65 of the carriage 63. The vacuum-stat VVE2 thereupon detects presence of vacuum in the cup 65 and delivers a signal which initiates operation of the motor 77 to drive the carriage 63 downstream.

The operations of coating or injection of sealing material at station B take place in a fashion practically identical with those hereinabove described for the first coating station A, with the motor changing to low speed for contact of nozzles 8, 9 with the window edges and disengagement therefrom during the course of travel of the carriage. The detector CCE2 is disposed similarly to the detector CCE1, that is, a little bit upstream of the nozzles 8 and 9, and develops signals upon passage of the leading and trailing edges 1 and 2 of the window.

While the coating of the edges 3 and 4 is taking place, the arm 102 returns to its upper position and operates the end of travel switch Fc35. This delivers a signal which stops the motion of the control cylinder 104 and initiates return of the column 95 by actuating the cylinder 101. This return rotation continues until the arm 100 operates the end of travel switch Fc21 which delivers a stop signal for the cylinder 101. The column 95, its arm 96, and the arm 102 with its suction cups 97, 98 and 99 are then stopped in upstream position.

The end of travel switches Fc21 and Fc22 are positioned so that the rotation of column 95 is equal to the angle through which the window must be rotated, i.e. 90° in the case illustrated.

Whereas in the case of the first coating station A it is the passage of the carriage which initiates slowing and then stopping of the carriage drive motor, in the case of the second coating station B it is the leading edge of the window which controls these operations. When that edge passes the detector C44 the drive motor 77 changes to low speed. When that edge operates the detector C45, the motor 77 is stopped, and the suction cups 118 rise into contact with the window and vacuum is applied to them.

When the vacuum-stat VVE3 senses the presence of vacuum in cups 118, it delivers a signal which actuates cylinder 122 to raise the manipulator I, and energizes the motor 77 for return upstream of the carriage 63. When the carriage operates switch Fc42 the motor changes to low speed, and when it operates the end of travel switch Fc41 the motor is stopped. The carriage is then in its upstream position $N_1$.

When the frame 117 of the manipulator I arrives at its vertical position, it operates an end of travel switch Fc47 which delivers a signal stopping the cylinder 122 and cutting off vacuum to the cups 118. The window is then delivered in vertical orientation to the next downstream operating station J. The window is held momentarily in place by the downward vertical motion of the arm 130. This arm, when it arrives in its lower position, operates the end of travel switch Fc78. This delivers a signal which restores the manipulator I to horizontal position and initiates downward motion of the cups 118.

Whereas the carriage 62 of station A executes a motion through a fixed and predetermined distance, the carriage 63 of station B, although it always starts from the same upstream position $N_1$ under control of the end of travel switch Fc41, will terminate its downstream travel at various positions as a function of the dimensions of the window since it is the edge 1 which operates the switch C45. The leading edge 1, whatever the dimensions of the window 5, always stops at the same point at a horizontal distance $x$ from the axis 119 of the manipulator I. This distance $x$ is equal to the vertical distance $y$ which separates that axis from the plane of the conveyor at the downstream operating station J. In this way, when the manipulator I is in vertical position, the edges I of the windows will rest on the conveyor whatever their dimensions.

As will be understood from the foregoing, the apparatus of the invention operates efficiently and there is essentially no lost time. Successive windows may be rapidly processed with only short intervals therebetween.

We claim:

1. A method for automatically and continuously applying plastic material to the four edges of a multiple-pane window comprising the steps of
    (a) placing and centering a multiple-pane window on a first carrier therefor,
    (b) advancing the centered multiple-pane window along a first predetermined path,
    (c) simultaneously applying plastic material to two opposite edges of the multiple-pane window by a pair of nozzles,
    (d) transferring the multiple-pane window from the first carrier to a second carrier by rotating the multiple-pane window in such a fashion as to orient the uncoated edges in a position such that they may be subsequently coated,
    (e) advancing the transferred multiple-pane window along a second predetermined path by the second carrier between a second pair of spaced apart nozzles,
    (f) simultaneously applying plastic material to the two uncoated opposite edges of the multiple-pane window, and
    (g) measuring a predetermined function of the length of the multiple-pane window as it is advanced by the first carrier along the first predetermined path, and automatically having the spacing of the second pair of nozzles adjusted in order to generally correspond to the spacing between the two uncoated edges of the window in response to said measuring.

2. The method as set forth in claim 1 further including the steps of placing the multiple-pane window on the first carrier with the mid-point thereof being situated between the leading and trailing edges thereof which coincides with a predetermined point of the carrier, and wherein said measuring step produces a signal corresponding to the length of the window as determined by travel of the leading edge of the window.

3. The method as set forth in claim 2 including the preliminary steps of supplying the multiple-pane window to the first carrier in a generally vertical position before said step of placing it on the first carrier and thereafter rotating it from the generally vertical position to a generally horizontal position whereat it is grasped in a fixed position on the first carrier.

4. The method as set forth in claim 2 further including the steps of receiving the window in a generally horizontal position on the second carrier and vertically orienting it by rotating the multiple-pane window about an axis of rotation relative to the second carrier by a manipulator such that it assumes a generally vertical position.

5. The method as set forth in claim 4 further comprising the steps of stopping the leading edge of the windows at a distance from the manipulator so as to enable them to be turned vertically regardless of their length.

6. Apparatus for applying plastic material to the four edges of a multiple-pane window which comprises
   (a) a first pair of opposed injection nozzles equidistantly spaced from a longitudinal axis;
   (b) first carrier means for moving said multiple-pane window horizontally along a longitudinal axis between said first pair of nozzles for simultaneously applying plastic material to two opposite edges of the multiplepane window;
   (c) a second pair of opposed injection nozzles positioned downstream of said first pair with respect to the path of travel of the multiple-pane window and likewise equidistantly spaced from said longitudinal axis;
   (d) second carrier means for moving said multiple-pane window horizontally along said axis between said second pair of nozzles for simultaneously applying plastic material to two opposite edges of said multiple-pane window; and (e) transfer means including
      (1) a column adapted for rotation about a vertical axis,
      (2) an arm extending laterally of said column,
      (3) grasping means carried by said arm for grasping said multiple-pane window,
      (4) means for positioning said grasping means over a multiple-pane window on said first carrier means and grasping said multiple-pane window,
      (5) means for rotating said column for transferring said multiple-pane window from said first to said second carrier means, and
      (6) means for positioning said multiple-pane window on said second carrier means in an orientation so that the edges uncoated by said first pair of nozzels are in position for coating by said second pair of nozzles and releasing said multiple-pane window.

7. Apparatus according to claim 6 in which the angle of rotation of said column is equal to the angle of rotation of the multiple-pane window between said first and second carrier means required to orient the uncoated edges thereof in position for coating by said second pair of nozzles.

8. Apparatus in accordance with claim 7 in which said first and second carrier means are in alignment, and said equal angles of rotation are 90°.

9. Apparatus for applying plastic material to the four edges of a multiple-pane window which comprises
   (a) a first pair of spaced opposed injection nozzles,
   (b) first carrier means for moving said multiple-pane window horizontally between said first pair of nozzles for simultaneously applying plastic material to two opposite edges of the multiple-pane window,
   (c) a second pair of spaced opposed injection nozzles positioned downstream of said first pair with respect to the path of travel of the multiple-pane window,
   (d) second carrier means for moving said multiple-pane window horizontally between said second pair of nozzles for simultaneously applying plastic material to two opposite edges of the multiple-pane window,
   (e) transfer means for transferring the multiple-pane window from said first to said second carrier means and rotating the multiple-pane window to orient the edges uncoated by said first pair of nozzles in position for coating by said second pair of nozzles,
   (f) means responsive to the travel of the window on said first carrier means for measuring a predetermined function of the length of the window thereon,
   (g) means responsive to said function of the length for adjusting the separation of said second pair of nozzles to correspond with the width of the window passing thereby after rotation by said transfer means,
   (h) means for placing a window on said first carrier means with the mid-point between the leading and trailing edges thereof coinciding with a predetermined point of the carrier means,
   (i) means for stopping the downstream travel of said first carrier means with said predetermined point thereof at a fixed location,
   (j) said means responsive to the travel of the window being responsive to the leading edge of a window on said first carrier means past said fixed location for producing a signal corresponding to said function of the length of the window, and
   (k) said means responsive to the travel of the leading edge of the window includes a finger mounted on a sprocket chain supported by sprocket wheels, and a potentiometer driven by one of said sprocket wheels, said finger being positioned to be engaged by said leading edge and move therewith, said potentiometer yielding a reference signal corresponding to said function of the length of the window.

10. Apparatus according to claim 9 including motor means for adjusting the separation of said second pair of nozzles, and means for utilizing said reference signal to produce a corresponding drive of said motor means.

11. Apparatus for applying plastic material to the four edges of a multiple-pane window which comprises
   (a) a first pair of spaced opposed injection nozzles,
   (b) first carrier means for moving said multiple-pane window horizontally between said first pair of nozzles for simultaneously applying plastic material to two opposite edges of the multiple-pane window,
   (c) a second pair of spaced opposed injection nozzles positioned downstream of said first pair with respect to the path of travel of the multiple-pane window,
   (d) second carrier means for moving said multiple-pane window horizontally between said second pair of nozzles for simultaneously applying plastic material to two opposite edges of the multiple-pane window,
   (e) transfer means for transferring the multiple-pane window from said first to said second carrier means and rotating the multiple-pane window to orient the edges uncoated by said first pair of nozzles in position for coating by said second pair of nozzles, and
   (f) means responsive to the travel of the window on said first carrier means for measuring a predetermined function of the length of the window thereon, and means responsive to said measuring means for automatically adjusting the separation of said second pair of nozzles to thereby correspond with spacing between uncoated edges of the window after rotation by said transfer means.

12. Apparatus according to claim 11 including means for stopping the downstream travel of said first carrier means with a predetermined point thereof at a fixed location, and said means responsive to the travel of the leading edge of the window on said first carrier means past said fixed location for producing a signal corresponding to said function of the length of the window.

13. Apparatus according to claim 11 including means for placing a window on said first carrier means with the midpoint between the leading and trailing edges thereof coinciding with a predetermined point of the carrier means.

14. Apparatus for applying plastic material to the four edges of a multiple-pane window which comprises
   (a) a first pair of spaced opposed injection nozzles,
   (b) first carrier means for moving said multiple-pane window horizontally between said first pair of nozzles for simultaneously applying plastic material to two opposite edges of the multiple-pane window,
   (c) a second pair of spaced opposed injection nozzles positioned downstream of said first pair with respect to the path of travel of the multiple-pane window and being automatically movable relative to the path of travel of the multiple-pane window to adjust their spacing to conform to the spacing between uncoated edges of the window,
   (d) second carrier means for moving said multiple-pane window horizontally between said second pair of nozzles for simultaneously applying plastic material to two opposite edges of the multiple-pane window,
   (e) transfer means for transferring the multiple-pane window from said first to said second carrier means and rotating the multiple-pane window to orient the edges uncoated by said first pair of nozzles in position for coating by said second pair of nozzles,
   (f) means for measuring a function of the length of the window as it moves on said first carrier means, and for creating a signal, and
   (g) means responsive to said measuring means signal for automatically moving said second pair of nozzles so that they are adjusted to the spacing between the uncoated edges of the window.

15. Apparatus according to claim 14 including means for placing a window on said first carrier means with the mid-point between the leading and trailing edges thereof coinciding with a predetermined point of the carrier means, means for stopping the downstream travel of said first carrier means with said predetermined point thereof at a fixed location, and said means responsive to the travel of the window being responsive to the leading edge of a window on said first carrier means past said fixed location for producing the signal corresponding to said function of the length of the window.

16. Apparatus for applying plastic material to the four edges of a multiple-pane window which comprises
   (a) a first pair of spaced opposed injection nozzles;
   (b) first carrier means for moving said multiple-pane window horizontally between said first pair of nozzles for simultaneously applying plastic material to two opposite edges of the multiple-pane window;
   (c) a second pair of spaced opposed injection nozzles positioned downstream of said first pair with respect to the path of travel of the multiple-pane window;
   (d) second carrier means for moving said multiple-pane window horizontally between said second pair of nozzles for simultaneously applying plastic material to two opposite edges of the multiple-pane window, said second carrier means including
      (1) a carriage provided with a central suction cup for grasping said window,
      (2) stop means for stopping said carriage of the second carrier means at a predetermined upstream position thereof; and
   (e) transfer means for transferring the multiple-pane window from said first to said second carrier means and rotating the multiple-pane window to orient the edges uncoated by said first pair of nozzles in position for coating by said second pair of nozzles, said transfer means including
      (1) a column rotatable about a vertical axis, the angle of rotation of said column being equal to the angle of rotation of the multiple-pane window between said first and second carrier means,
      (2) an arm extending laterally of said column,
      (3) grasping means carried by said arm for grasping the multiple-pane window while on said first carrier means at the axis of symmetry thereof,
      (4) means for positioning said grasping means over a multiple-pane window on said first carrier means whereby said grasping means grasps said multiple-pane window,
      (5) means for rotating said column to move said multiple-pane window over said carrier means,
      (6) means for positioning the multiple-pane window on said second carrier means and releasing said multiple-pane window, and
   wherein said upstream position is correlated with said angle of rotation of the column of the transfer means to receive a window with said axis of symmetry thereof coincident with the axis of said central suction cup.

17. Apparatus according to claim 16 in which said grasping means of the transfer means has an axis of symmetry, said first carrier means including a carriage provided with a central suction cup for grasping said window, and stop means for stopping said carriage of the first carrier means at a predetermined downstream position thereof wherein the axis of the suction cup thereof coincides with said axis of symmetry of the grasping means of the transfer means when the latter is in position to grasp a window on said first carrier means.

18. Apparatus as set forth in claim 16 wherein said second carrier means includes at least a pair of spaced apart rollers adapted to engage opposed edges of the multiple pane window, means supporting said rollers for oscillatable movement between engaging and non-engaging positions, and means for oscillating said rollers between said engaging and non-engaging positions.

19. Apparatus for applying plastic material to the four edges of a multiple-pane window which comprises
   (a) a first pair of spaced opposed injection nozzles;
   (b) first carrier means for moving said multiple-pane window horizontally between said first pair of nozzles for simultaneously applying plastic material to two opposite edges of the multiple-pane window;
   (c) a second pair of spaced opposed injection nozzles positioned downstream of said first pair with respect to the path of travel of the multiple-pane wndow;

(d) second carrier means for moving said multiple-pane window horizontally between said second pair of nozzles for simultaneously applying plastic material to two opposite edges of the multiple-pane window;

(e) transfer means for transferring the multiple-pane window from said first to said second carrier means and rotating said multiple-pane window to orient the edges uncoated by said first pair of nozzles in position for coating by said second pair of nozzles;

(f) means responsive to the travel of the window on said first carrier means for measuring a predetermined function of the length of the multiple-pane window thereon; and, (g) means responsive to said function of the length for adjusting the separation of said second pair of nozzles to correspond with the width of the window passing thereby after rotation by said transfer means.

20. Apparatus according to claim 19 including means for placing a window on said first carrier means with the mid-point between the leading and trailing edges thereof coinciding with a predetermined point of the carrier means, means for stopping the downstream travel of said first carrier means with said predetermined point thereof at a fixed location, and said means responsive to the travel of the window being responsive to the leading edge of a window on said first carrier means past said fixed location for producing a signal corresponding to said function of the length of the window.

21. Apparatus for applying plastic material to the four edges of a multiple-pane window which comprises (a) a first pair of spaced opposed injection nozzles;

(b) first carrier means for moving said multiple-pane window horizontally between said first pair of nozzles for simultaneously applying plastic material to two opposite edges of the multiple-pane window, said first carrier means including (1) a carrier having grasping means for receiving and grasping a window supplied thereto, and (2) means for establishing a predetermined upstream position of said carriage with a predetermined center point thereof, (c) supply means adjacent said first carrier means for receiving a window in vertical orientation and centering the window with respect to a predetermined centering line midway between the leading and trailing edges thereof, said center point being opposite said centering line of the supply means, and said supply means including (1) means for rotating a window centered thereon to deposit the window on said carriage in centered relationship therewith;

(d) a second pair of spaced opposed injection nozzles positioned downstream of said first pair with respect to the path of travel of the multiple-pane window;

(e) second carrier means for moving said multiple-pane window horizontally between said second pair of nozzles for simultaneously applying plastic material to two opposite edges of the multiple-pane window; and (f) transfer means for transferring the multiple-pane window from said first to said second carrier means and rotating the multiple-pane window to orient the edges uncoated by said first pair of nozzles in position for coating by said second pair of nozzles.

22. Apparatus for applying plastic material to the four edges of a multiple-pane window which comprises a first pair of spaced opposed injection nozzles;

(b) first carrier means for moving said multiple-pane window horizontally between said first pair of nozzles for simultaneously applying plastic material to two opposite edges of the multiple-pane window;

(c) a second pair of spaced opposed injection nozzles positioned downstream of said first pair with respect to the path of travel of the multiple-pane window;

(d) second carrier means for moving said multiple-pane window horizontally between said second pair of nozzles for simultaneously applying plastic material to two opposite edges of the multiple-pane window;

(e) transfer means for transferring the multiple-pane window from said first to said second carrier means and rotating the multiple-pane window to orient the edges uncoated by said first pair of nozzles in position for coating by said second pair of nozzles;

(f) manipulator means downstream of said second carrier means for receiving a window therefrom and orienting it vertically;

(g) conveyor means for receiving windows from said manipulator means; and (h) detector means responsive to the leading edge of a window on said second carrier means for stopping the second carrier means when the leading edge of the window thereon is a predetermined distance from the axis of rotation of said manipulator means to enable the window to be turned vertically regardless of its length.

* * * * *